(Model.)
W. V. R. BLIGHTON.
NUT LOCK.
No. 287,796.          Patented Nov. 6, 1883.
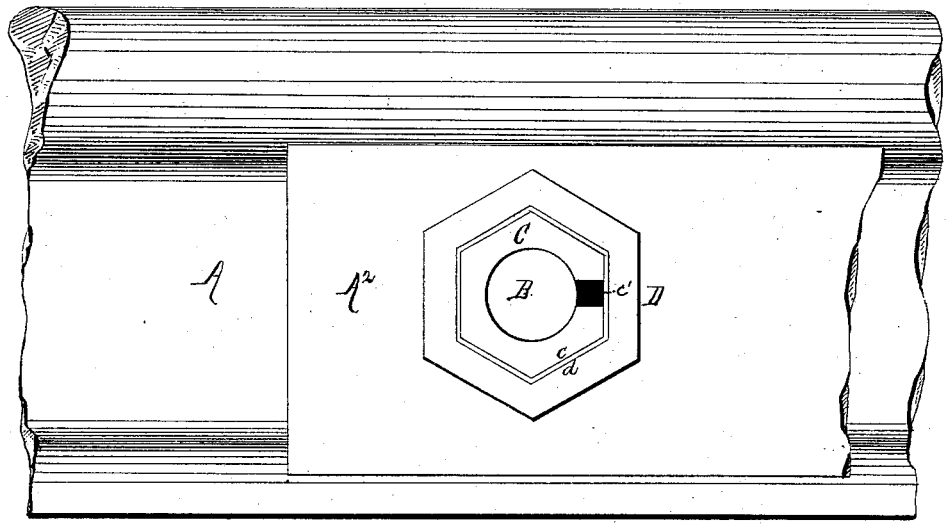
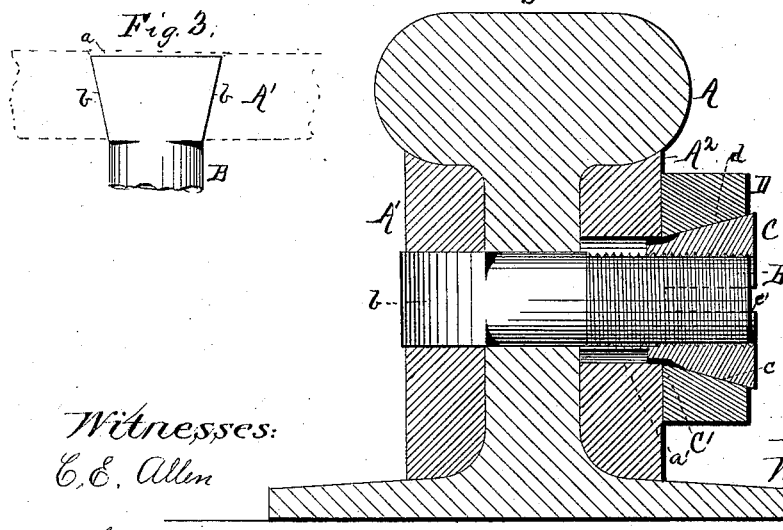
Witnesses:
C. E. Allen
A. G. Buhrman
Inventor:
Wm V. R. Blighton
per Atty.
J. N. Kalb

United States Patent Office.

WILLIAM V. R. BLIGHTON, OF TONAWANDA, NEW YORK.

NUT-LOCK.

SPECIFICATION forming part of Letters Patent No. 287,796, dated November 6, 1883.

Application filed April 9, 1883. (Model.)

*To all whom it may concern:*

Be it known that I, WILLIAM V. R. BLIGHTON, a citizen of the United States, residing at Tonawanda, in the county of Erie and State of New York, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to a peculiar form of nut-lock.

I make the bolt which I prefer to use with my nut with a flat head on two sides, while the other two sides are tapered. This, when inserted in a correspondingly-formed hole in a fish-plate or other part to be united to another, will draw the said part firmly and securely, and leave no liability or possibility of slipping through or turning round. At the same time this construction allows the bolt to be made at a greatly-reduced cost of material, which in the number of bolts used upon a railroad aggregates a great deal.

My nut is formed with a reduced end and a slit in the large end. The large end is to be brought in contact with the seat for the nut, and when screwed up is compressed upon the bolt and securely locked. The exterior of the nut is tapering in general form, besides having the reduced portion, and the fish-plate has an opening large enough for the reduced portion of the nut to enter. By this construction all the pressure comes upon the outer end of the nut where the slit is made, and it is pinched up against the bolt and securely locked. The nut is non-circular in form, and the seat is correspondingly formed, and the screwing is done by turning the seat.

The accompanying drawings illustrate what I consider the best method of carrying the invention into practice.

Figure 1 is a side elevation of a rail, showing an end view of the nut, seat, and bolt. Fig. 2 is a cross-section of the parts, showing the bolt in full. Fig. 3 is a detail showing the head of the bolt.

Similar letters of reference indicate corresponding parts in all the figures.

A represents the rail or other part to be joined. A' is one fish-plate or analogous part, and $A^2$ the other.

B is my bolt, which is formed with two flat or parallel sides, and the head in this direction is of equal width with the body of the bolt. The bolt has two tapering sides, $b\ b$, in the other direction, and is fitted into a correspondingly-shaped opening, $a$, in the fish-plate A'. By this construction I economize greatly in the consumption of iron in the manufacture of the bolts, and at the same time produce a form which precludes the possibility of the bolt slipping through or turning round.

C is my locking-nut, which is formed with non-circular tapering sides $c$, and a reduced portion, C', at one end. The larger portion is provided with a slit, $c'$, which extends to about five-sevenths the depth of the nut.

D is the nut-seat, which is correspondingly formed with non-circular tapering inner walls, $d$, to fit upon the nut. When the seat is fitted upon the nut, or, more properly, when the nut is placed in the seat, and they together are screwed upon the bolt, by turning the nut-seat, the said seat D presses upon the larger or outer end of the nut C only, and this end, being made compressible by having a slit in it, is pinched up against the sides of the bolt and forms a secure locking means. The reduced end C' of the nut C passes freely, without touching, through the seat D, and into an opening, $a'$, made sufficiently large in the fish-plate $A^2$ to admit this reduced portion of the nut. By this construction all the pressure upon the nut comes upon the larger or outer end, where the slit is made and the compressibility of the nut is located, while the inner reduced end receives no pressure. The pinching being all done at the outer and larger end, which comes last upon the bolt, and the inner end, which starts upon the bolt when the nut is to be put in place, not being compressible at all, easy and ready application is insured. The starting end of the nut is always the same, and remains the same when the nut is in place. The locking at the outer end is secure and strong, and the liability to become loosened is diminished thereby.

The bolt can be formed with the tapering projections $b\ b$ either with square or round corners. The bolt is in effect a straight, round, headless bolt, with two tapering projections raised on two sides of one end.

I reserve the right to make future application for Letters Patent for the bolt here shown and described.

Having thus described my invention, what I desire to claim and secure by Letters Patent is—

A nut formed with a reduced portion at the inner end and a non-circular larger outer end, provided with a slit, as described, to give said larger end compressibility, in combination with a nut-seat having inner walls of a form corresponding with the larger end of the nut, and an opening sufficiently large to prevent pressure upon the reduced portion, whereby the nut is pinched in only at the larger outer end, while the inner end, which starts upon the bolt, is never compressed, substantially as set forth.

In testimony whereof I affix my signature in presence of two witnesses.

WILLIAM V. R. BLIGHTON.

Witnesses:
  I. N. KALB,
  GEO. M. LOCKWOOD.